United States Patent

[11] 3,609,544

[72] Inventors James W. Milligan
West Lafayette;
Russell F. Graefnitz, Lafayette; George N. Burkhart, Jr., Brookston, all of Ind.
[21] Appl. No. 840,264
[22] Filed July 9, 1969
[45] Patented Sept. 28, 1971
[73] Assignee Duncan Electric Company, Inc.
Lafayette, Ind.

[54] WATT-HOUR METER WITH SHIFTING SCREW AS LIGHT LOAD ADJUSTMENT
9 Claims, 3 Drawing Figs.

[52] U.S. Cl. .................................................. 324/138
[51] Int. Cl. .................................................. G01r 11/02
[50] Field of Search........................................... 324/137, 138

[56] References Cited
FOREIGN PATENTS
664,238 6/1963 Canada ........................ 324/138

*Primary Examiner*—Alfred E. Smith
*Attorney*—Darbo, Robertson & Vandenburgh

ABSTRACT: A watt-hour meter for alternating current is adjusted for accuracy of measurement of light loads by shifting a unitary part, preferably a screw unit, which is the only part that moves for this adjustment. The phasing plate which heretofore has been movable for light load adjustment is now fixed in position, dispensing with the relatively complicated means for achieving accurate light load adjustment by its movement. The illustrated moving adjustment structure of screw unit consists solely of a screw of magnetic metal carrying conductive sleeve means fixed thereon. The most effective part of the sleeve is copper. The screw can be turned from the front of the meter with a screwdriver and the threads are engaged under resilient tension to avoid backlash. The screw carries leakage flux between the central pole and two side poles. The movement of the screw unit varies the light load compensation by increasing the effect of the unit as to one side and decreasing it as to the other side, thus changing the magnetic dissymmetry.

Inventors
James W. Milligan,
Russell F. Graefnitz
and George N. Burkhart, Jr.
By Darbo, Robertson & Vandenburgh
Attys.

3,609,544

WATT-HOUR METER WITH SHIFTING SCREW AS LIGHT LOAD ADJUSTMENT

INTRODUCTION

The invention of which this disclosure is offered for public dissemination in the event adequate patent protection is available relates to improved accuracy adjustment in watt-hour meters, particularly the light load adjustment. The watt-hour meter is familiarly known to home owners as the electricity meter. Such meters have long been provided with various adjustment devices for achieving greater accuracy than would otherwise be possible.

One class of adjustment devices for such watt-hour meters is that known as the light load adjustment. Meters naturally tend to need light load compensation. The need for such compensation can be recognized by realizing that the magnetization curve of the iron laminations in the current stator of the meter is not a straight line. Meter accuracy at light loads requires compensation for the droop of this curve at low flux densities, and also compensation for minute dissymmetries of parts, unavoidable in mass production and which produce a magnetic dissymmetry. The light load compensation may add a minute force developed entirely by the line voltage so that it is present at all times for aiding in the driving of the disk when that part of the force that is a function of the current in the metered circuit is extremely low. Even if the design includes some offsetting factors for the droop mentioned, exact prediction of the equality between the offsetting factors and the need for compensation is impossible, and of course the magnetic dissymmetry is unpredictable as to direction or value. Therefore, the compensation must be adjustable. In a well designed meter having such offsetting factors, the adjustable compensation may be needed in either direction.

For many years, the light load adjustment in such meters has involved physically shifting a "light load plate." Typically, this plate formed a conductive loop around the potential pole, i.e., pole of the electromagnet excited by the line voltage, this pole of course forming one side of the gap through which the meter disk rotates. Many inventions concerned with the light load plates have been made, particularly with respect to the means for moving them, one example being found in Green U.S. Pat. No. 2,167,649.

According to the present invention, there is no moving light load plate with the attendant difficulties of accurate plate movement. Inasmuch as the former light load plate also served as a lag loop to provide proper phase displacement of the fluxes produced by the two electromagnets forming the driving element, such a loop may still be provided; but it may be rigidly mounted.

The sole moving part of the light load adjustment is a unitary piece or assembly. In the preferred form, this is a screw unit including as one unitary assembly a magnetic screw carrying rigidly therewith, to move with it, a highly conductive sleeve. The sleeve surrounds an intermediate portion of the length of the screw. The magnetic screw extends transversely of the three conventional legs of the typically E-shaped voltage core so that the screw carries leakage flux between the central leg (which forms the main voltage pole) and each of the side legs. The conductive means surrounding the screw causes a phase lag in the flux passing through the screw. Shifting the screw axially by screwing it, increases the screw-carried flux on one side and decreases it on the other, thus increasing the effectiveness as to one side leg and decreasing it as to the other side leg. Thus the axial movement of the screw differentially affects the two sides as to the amount of leakage flux which is lagged. Although the leakage path believed to be followed by the leakage flux which thus energizes the screw does not pass through the disk, it nevertheless has a surprisingly strong effect on the flux which does pass through the disk, accomplishing adequate light load adjustment.

Additional objects and advantages of the invention will be apparent from the following description and from the drawings.

DESIGNATION OF FIGURES

BACKGROUND DESCRIPTION

Figure 1:
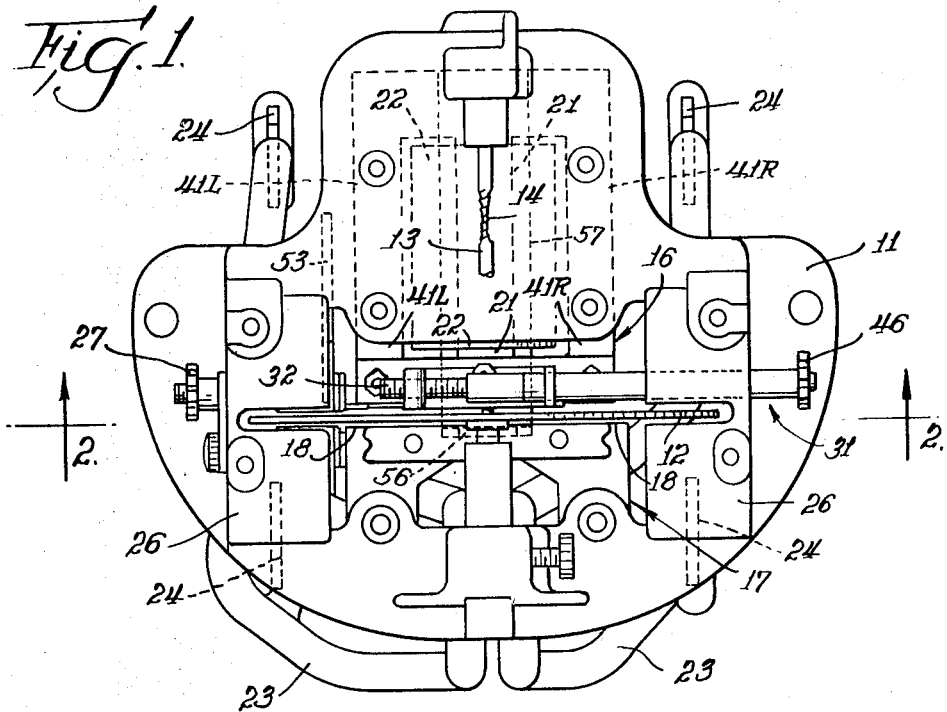
FIG. 1 is a front view of a meter element embodying a preferred form of the present invention.

The meter element illustrated includes a frame 11 by which a disk 12 is rotatably carried. The disk is driven by interaction between a voltage magnet 16 and a current magnet 17. The current magnet has a pair of pole faces 18 forming one side of the gap in which the disk rotates, and the voltage magnet has a central pole face 19, seen best in FIG. 2, forming the opposite side of the disk-receiving gap. The pole face 19 is located at the end of a central leg 21 of the voltage lamination stack, this leg carrying a voltage coil 22, which contributes the portion of the meter energization representing the voltage in the circuit being measured. The current in the circuit being measured is carried by the current coil conductors 23. These may be called the current coil, although in the illustrated form of meter they do not look much like a coil inasmuch as each comprises a coil of only a single turn, passing once through the aperture of the C-shaped current lamination stack. Each of the current conductors 23 is connected between two terminal blades 24, by which the meter may be plugged into a socket in conventional manner.

As is well known, each of the coils 22 and 23 causes flux to pass through the disk. Flux from each source produces eddy currents in the disk, which eddy currents react with flux from the other source to drive the disk. The disk also rotates through gaps in one or more damping magnet assemblies 26 for retarding the disk 12 to make its speed of rotation proportional to the momentary power use in the circuit being measured. At least one damping unit 26 is provided with a full load adjustment 27 which adjusts the amount of constant flux from the permanent magnets of this unit which passes through the disk so that at a given power consumption representing "full load" the meter can be made quite accurate. Modern meters are designed so that they will then also be satisfactorily accurate over a wide range of load conditions. However, it is not practicable to obtain accuracy at very light loads by the full load adjustment. Accordingly it has been conventional for quite a few decades to provide a separate light load adjustment. The light load adjustment of the present invention is greatly simplified as compared to the past light load adjustment, which conventionally used shifting plates together with a wide variety of relatively complex mechanism for shifting the plate with the necessary delicacy and dependability of adjustment.

Although the following disclosure offered for public dissemination is detailed to ensure adequacy and aid understanding, this is not intended to prejudice that purpose of a patent which is to cover each new inventive concept therein no matter how others may disguise it by variations in form or additions or further improvements. The claims at the end hereof are intended as the chief aid toward this purpose as it is these that meet the requirement of pointing out the parts, improvements, or combinations in which the inventive concepts are found.

LIGHT LOAD ADJUSTMENT OF PRESENT INVENTION

Figure 2:
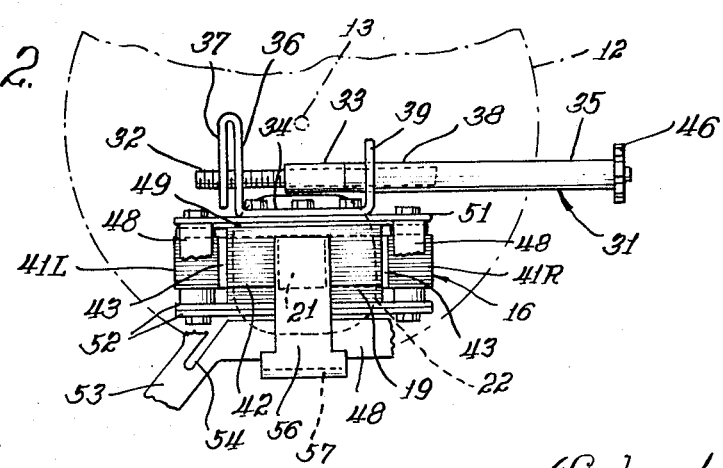
FIG. 2 is a view looking at the lower face of the voltage magnet of FIG. 1, the disc being represented by broken lines, thus corresponding approximately to a view looking upwardly from the plane 2—2 of FIG. 1.
Figure 3:
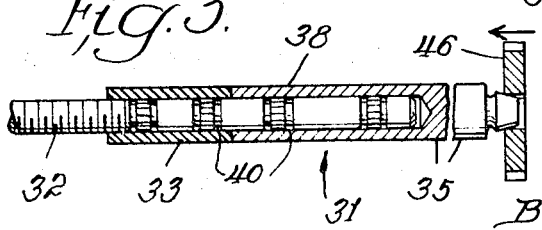
FIG. 3 is a sectional view longitudinally of the screw unit on an enlarged scale showing its preferred assembly.

The preferred form of light load adjustment of the present invention is seen best in FIG. 2 which also makes its amazing simplicity quite apparent. Essentially, the light load adjustment comprises a screw unit 31, the most important portions of which are a magnetic screw 32 and a copper sleeve 33 firmly secured on the screw. The screw is carried by a bracket 34 which is secured to the lamination of the voltage magnet 16. The screw 32 has antibacklash threaded engagement. As now planned, there is threaded engagement with both a main bend 36 and a return bend 37 of bracket 34. These may both be threaded, with the threads out of step with one another so as to be resiliently flexed with respect to one another when engaging the screw. Alternatively, bend 37 may be bifurcated and reshaped or dimensioned to be sprung by the screw. Thus the thread surfaces of the screw are in either case engaged under elastic tension so that backlash is eliminated.

The screw unit 31, and more specifically the shaft 35, drilled to provide a sleeve portion 38 holding the shank of screw 32, has a snug fit with an aperture through the other bend 39 of bracket 34. The sleeve 38 is nonmagnetic so that screw 32 provides near-symmetry when centered. Shaft 35 is preferably aluminum, and although its conductivity is not nearly that of copper, sleeve 38 supplements the main conductivity of the sleeve 33. Sleeves 33 and 38 may both be rolled into grooves 40 to lock the parts of screw unit 31 firmly together.

As is apparent from both FIGS. 1 and 2, the magnet screw 32 extends transversely with respect to the vertically extending central core leg 21. Thus it also extends toward the side legs 41L and 41R of voltage magnet 16. These may be jointly spoken of as the side legs 41. The lamination stack of magnet 16 is of E-shape, the three legs 21 and 41 being joined at the top.

The central leg 21 has at the bottom thereof a laminated pole piece 42, and in fact it is the bottom of this pole piece which is the pole face 19. Between the terminal portions of the poles of legs 41L and 41R, respectively the pole piece 42 are air gaps 43. These air gaps, although narrow, are enough to cause much of the flux passing through pole piece 42 to choose the path through disk 12. Besides thus causing useful flux to pass through the disk, the air gaps 43 also cause considerable leakage flux to pass directly from the sides of pole piece 42 to the side legs 41L and 41R.

As seen in FIG. 2, the magnetic screw 32 is located where it would pick up much of this leakage flux. Even though the screw 32 is spaced considerably further from the lamination than the width of gap 43, its permeance still causes it to collect or carry much or most of the leakage flux which would otherwise be present in the air anyway. At the same time, the spacing of screw 32 is far enough from the lamination so that it does not objectionably divert a substantial percentage of the flux which would otherwise be useful flux passing through the disk. One test tends to indicate that the increased diversion accounts for less than an eighth of the total effect, thus indicating that lagging of the flux which would be leaking anyway contributes greatly to the total range of adjustment.

Were the sleeve 33 somewhat to the right of center as seen in FIG. 2, much of the flux between stack leg 41L and central pole piece 42 (or central leg 21) will pass into and out of screw 32 without passing through sleeve 33. So will some of the flux, but a smaller proportion thereof, passing between outside stack leg 41R and central pole piece 42. It follows that lag sleeve 33 will have a phase lagging effect on more of the flux involving right-hand stack leg 41R than of the flux involving left-hand stack leg 41L. The difference will be increased by turning screw 31 in a direction to screw it to the right, and will be decreased by screwing it to the left. As sleeve 33 passes a neutral position, nearly centered, it will begin to cause more lagging of the flux involving left-hand side leg 41L than of flux involving right-hand leg 41R. The exact position of screw unit 31 at which the transition of the greater effect from one side to the other occurs probably is not with the sleeve 33 exactly centered. One reason is that sleeve 38 has an influence and bends 36, 37 and 39 also have an influence since bracket 34 is made of conductive nonmagnetic metal such as red brass. Even the eddy currents within screw 32, which would be concentric with its axis, may add slightly to the total lagging effect. Preferably sleeve 33 is approximately centered on screw 32. There is no need to know where the transition occurs as to which side of center is lagged most because the change is smooth and continuous. Indeed, a given amount of turning of screw 31 has nearly the same effect throughout all or nearly all of its available range of adjustment, this "linear characteristic" being very desirable.

Because the face of the meter as seen in FIG. 1 is the front, the screw 32 extends laterally of the meter. Inasmuch as access from the side of the meter is not always convenient, the screw is provided with a head 46 having radial slots along its periphery so that a screwdriver may be inserted into the slot from the front and by tipping the screwdriver rather than turning it about its own axis the head 46 may be turned and the screw unit 31, including its sleeves 33 and 38, may be laterally adjusted or screwed one way or the other.

FIXED LAG PLATE

Because an adequate range of light load adjustment can be obtained by screw unit 31 it now becomes possible to mount the lag plate 48 as an integrated fully fixed part of the voltage magnet assembly 16. To this end, the side of the rectangular lag loop nearest the screw 32 is bent upwardly and mounted between the lamination stack and a nonmagnetic tie plate 51. Similar nonmagnetic tie plates 52 are provided at the far side of the stack of laminations, and bolts or rivets extending through the entire assembly hold all parts firmly together. Some of these also extend through bracket 34, firmly securing it to the assembly.

It is at present preferred that the lag loop 48 be formed with a tail 53, and with a slot 54 extending to the base of this tail. By extending the slot 54 the amount of lag can be decreased. Therefore by designing the lag plate 48 so that initially it always provides a slight excess of lagging, the slot can be extended to provide accurate lag. Preferably the tail 53, including the tip portion of the slot 54, is bent upwardly, so that a punching tool can be slipped into the meter from its top to extend the slot 54 as needed for accuracy. This in turn is facilitated by the fact that the lag plate is rigidly mounted so that the bent up tail will always be in a predetermined position within the meter. The tail 53 may be located at any point on the loop where, when suitably bent, it will be accessible to the tool after complete assembly of the meter. In FIG. 1 it is shown in more nearly its now intended position than in FIG. 2.

The illustrated form of voltage magnet includes a return tongue 56 located beyond the disk from the pole piece 19, and in fact positioned between the current poles having pole faces 18. The tongue 56 is connected through a vertical portion 57 with the upper end of the stack of voltage magnet 16. This tongue is believed to have no direct influence on the light load adjustment, except that it is one of the parts expected to have dissymmetries, as mentioned above. Although it forms another path for flux to and from the pole piece 42, and may result in somewhat less leakage flux being available for passing through screw 32, screw 32 still has enough leakage flux to provide an adequate range of adjustment.

Some meters have the slots 43 located closer together than the form shown. This would not prevent the use of the present invention, although tests might show that some redesigning would be desirable for maintaining uniformity of adjustment, and perhaps for obtaining a rate of adjustment that is as satisfactory as with the form illustrated.

VARIATIONS

Although many variations using this invention will be apparent to those skilled in the art, or developed, mention may be made of some.

The conductive loop represented by sleeve 33 need not be part of the screw unit. It could be fixedly mounted, and the screw 32 moved within it, perhaps with no detriment except as to ease of manufacture.

It is not essential to have the screw 32 move. Sleeve 33 could be moved along screw 32 or other member forming a path for concentrating the leakage flux. Prediction, with certainty, that as good linear adjustment characteristics could easily be provided, would be difficult.

Threaded adjustment members could be avoided, at least in theory, or if adjustment after sale would never be desired. For example, an unthreaded adjustment unit could be slid by a delicate temporarily applied device and locked permanently in place, as by crimping a sleeve, after adjustment, along a knurled magnetic rod.

ACHIEVEMENT

From the foregoing disclosure it is apparent that an extremely satisfactory light load adjustment has been provided, one which is inexpensive to manufacture, and which is nevertheless exceedingly satisfactory in all characteristics. It is especially advantageous as compared to the best prior adjustment devices in removing all of the troubles which have previously been attendant upon the use of movable light load adjustment plates. Operating chiefly on flux that otherwise would be wasted leakage flux, its theoretical consumption of energy in addition to that of the lag plate is of no consequence.

I claim:

1. A driving unit for a watt-hour meter including a voltage electromagnet having a magnetic core with side portions spaced magnetically near opposite sides of, and of opposite polarity to, a central leg pole having a face forming one side of a disk-receiving gap, and a current magnet having a core having two poles displaced laterally in opposite directions from the center of the first pole and having faces also facing the disk-receiving gap; characterized by light load adjustment means comprising a screw unit having its axis extending in magnetic proximity to the side portions and the central leg, having mounting means in which the screw unit turns on its axis and has an antibacklash threaded engagement; said screw unit having a magnetic portion extending axially thereof for concentrating therethrough leakage flux passing between said leg and side portions; said light load adjustment means including conductive means forming a short circuit loop surrounding the magnetic portion thereof and located to be selectively threaded at least in part by two flux bundles, each flux bundle being the leakage flux passing between the central leg and a different one of the side portions; the proportion of each of said bundles making up the total, depending upon the adjustment of the screw unit in its axial direction.

2. A driving unit for a watt-hour meter including a voltage electromagnet having a magnetic core with side portions spaced magnetically near opposite sides of, and of opposite polarity to, a central leg pole having a face forming one side of a disk-receiving gap, and a current magnet having a core having two poles displaced laterally in opposite directions from the center of the first pole and having faces also facing the disk-receiving gap; characterized by light load adjustment means comprising a screw unit having its axis extending in magnetic proximity to the side portions and the central leg, having mounting means in which the screw unit turns on its axis and has an antibacklash threaded engagement; said screw unit having a magnetic portion extending axially thereof for concentrating therethrough leakage flux passing between said leg and side portions; said light load adjustment means including conductive means forming a short circuit loop surrounding the magnetic portion thereof, forming a unitary part of the screw unit to move with it, and located to be selectively threaded at least in part by two flux bundles, each flux bundle being the leakage flux passing between the central leg and a different one of the side portions; the proportion of each of said bundles making up the total, depending upon the adjustment of the screw unit in its axial direction.

3. A driving unit for a watt-hour meter including a voltage electromagnet having a magnetic core with side portions spaced magnetically near opposite sides of, and of opposite polarity to, a central leg pole having a face forming one side of a disk-receiving gap, and a current magnet having a core having two poles displaced laterally in opposite directions from the center of the first pole and having faces also facing the disk-receiving gap; characterized by light load adjustment means comprising a screw unit having its axis extending in magnetic proximity to the side portions and the central leg, having mounting means in which the screw unit turns on its axis and has an antibacklash threaded engagement; said screw unit having a threaded magnetic central rod extending axially thereof for concentrating therethrough leakage flux passing between said leg and side portions; said light load adjustment means including conductive means forming a short circuit loop surrounding the magnetic portion thereof and located to be selectively threaded at least in part by two flux bundles, each flux bundle being the leakage flux passing between the central leg and a different one of the side portions; the proportion of each of said bundles making up the total, depending upon the adjustment of the screw unit in its axial direction.

4. A driving unit for a watt-hour meter including a voltage electromagnet having a magnetic core with side portions spaced magnetically near opposite sides of, and of opposite polarity to, a central leg pole having a face forming one side of a disk-receiving gap, and a current magnet having a core having two poles displaced laterally in opposite directions from the center of the first pole and having faces also facing the disk-receiving gap; characterized by light load adjustment means comprising a screw unit having its axis extending in magnetic proximity to the side portions and the central leg, having mounting means in which the screw unit turns on its axis and has an antibacklash threaded engagement; said screw unit having a threaded magnetic central rod extending axially thereof for concentrating therethrough leakage flux passing between said leg and side portions; said light load adjustment means including conductive means forming a short circuit loop surrounding the magnetic portion thereof, forming a unitary part of the screw unit to move with it, and located to be selectively threaded at least in part by two flux bundles, each flux bundle being the leakage flux passing between the central leg and a different one of the side portions; the proportion of each of said bundles making up the total, depending upon the adjustment of the screw unit in its axial direction.

5. A driving unit for a watt-hour meter including a voltage electromagnet having a magnetic core with side portions spaced magnetically near opposite sides of, and of opposite polarity to, a central leg pole having a face forming one side of a disk-receiving gap, and a current magnet having a core having two poles displaced laterally in opposite directions from the center of the first pole and having faces also facing the disk-receiving gap; characterized by light load adjustment means comprising a screw unit having its axis extending in magnetic proximity to the side portions and the central leg, having mounting means in which the screw unit turns on its axis and has an antibacklash threaded engagement; said screw unit having a magnetic portion extending axially thereof for concentrating therethrough leakage flux passing between said leg and side portions; said light load adjustment means including conductive means forming a short circuit loop surrounding the magnetic portion thereof and located to be selectively threaded at least in part by two flux bundles, each flux bundle being the leakage flux passing between the central leg and a different one of the side portions; the proportion of each of said bundles making up the total, depending upon the adjustment of the screw unit in its axial direction; said mounting means including a portion of highly conductive metal surrounding the magnetic portion.

6. A driving unit for a watt-hour meter including a voltage electromagnet having a magnetic core with the side portions spaced magnetically near opposite sides of, and of opposite polarity to, a central leg pole having a face forming one side of a disktreceiving gap, and a current magnet having a core having two poles displaced laterally in opposite directions from the center of the first pole and having faces also facing the disk-receiving gap; characterized by adjustment means comprising a screw unit, having mounting means in which the screw unit turns on its axis and has an antibacklash threaded engagement; said screw unit having a magnetic portion extending axially thereof; said adjustment means including conductive means surrounding the magnetic portion thereof and located to be selectively threaded at least in part by two flux bundles, the proportion of each of said bundles making up the total, depending upon he adjustment of the screw unit in its axial direction; said screw unit being formed of both magnetic and nonmagnetic portions, one as an inner member threaded on one end and the other as a sleeve surrounding and tightly mounted on the inner member, said unit having a portion of diameter at least equal to that of the sleeve relatively remote from the end threaded, and snugly fitting a hole in the mounting means through which the sleeve has been inserted.

7. A driving unit for a watt-hour meter including a voltage electromagnet having a magnetic core with a driving pole and which produces a nearly balanced magnetic field, and which has at least one side portion spaced magnetically near one side of, and of opposite polarity to, the driving pole; the driving pole having a face forming one side of a disk-receiving gap, and a current magnet having a core having two poles displaced laterally in opposite directions from the center of the first pole and having faces also facing the disk-receiving gap; characterized by light load adjustment means comprising a screw unit having its axis extending in magnetic proximity to the side portion and the driving pole, having mounting means in which the screw unit turns on its axis and has threaded engagement; said screw unit having a magnetic portion extending axially thereof for concentrating therethrough leakage flux passing between said driving pole and side portion; said light load adjustment means including conductive means forming a short circuit loop surrounding the magnetic portion thereof and selectively located to be threaded by such part of the maximum leakage flux which may be made to pass through the screw unit between the driving pole and the side portion, as produces light load accuracy for the meter; the amount of said part threading the loop depending upon the adjustment of the screw unit in its axial direction.

8. A driving unit for a watt-hour meter including a voltage electromagnet having a magnetic core with a driving pole and which produces a nearby balanced magnetic field, and which has at least one side portion spaced magnetically near one side of, and of opposite polarity to, the driving pole; the driving pole having a face forming one side of a disk-receiving gap, and a current magnet having a core having two poles displaced laterally in opposite directions from the center of the first pole and having faces also facing the disk-receiving gap; characterized by light load adjustment means comprising an elongate magnetic member extending in magnetic proximity to the side portion and the driving pole for concentrating therethrough leakage flux passing between said leg and the driving pole; said light load adjustment means including conductive means forming a short circuit loop surrounding the magnetic member and selectively located to be threaded by such part, of the maximum leakage flux which may be made to pass through the magnetic member between the driving pole and the side portion, as produces light load accuracy for the meter.

9. A driving unit for a watt-hour meter including a voltage electromagnet having a magnetic core with a driving pole and which produces a nearly balanced magnetic field, and which has at least one side portion spaced magnetically near one side of, and of opposite polarity to, the driving pole; the driving pole having a face forming one side of a disk-receiving gap, and a current magnet having a core having two poles displaced laterally in opposite directions from the center of the first pole and having faces also facing the disk-receiving gap; characterized by light load adjustment means comprising an elongate magnetic member extending in magnetic proximity to the side portion and the driving pole for concentrating therethrough leakage flux passing between said leg and the driving pole; said light load adjustment means including conductive means forming a short circuit loop surrounding the magnetic member; and at least one of said magnetic member and loop being selectively located to produce light load accuracy for the meter by having been moved to vary the amount of leakage flux threading the short circuit loop in passing between the driving pole and the side portion until said accuracy is achieved.